United States Patent [19]

Itazu

[11] Patent Number: 4,591,032
[45] Date of Patent: May 27, 1986

[54] PRESSURE REGULATOR MECHANISM FOR HYDRAULIC DEVICES

[76] Inventor: Fumio Itazu, 436, Shimokobi, Kobi-Cho, Minokamo-shi, Gifu-ken, Japan

[21] Appl. No.: 633,789

[22] Filed: Jul. 24, 1984

[30] Foreign Application Priority Data

Mar. 22, 1984 [JP] Japan .................. 59-55660

[51] Int. Cl.[4] ........................ F16F 9/34
[52] U.S. Cl. .................. 188/313; 188/318; 188/322.13; 188/322.19
[58] Field of Search ............ 188/285, 286, 287, 299, 188/300, 311, 312–318, 322.13, 322.19; 91/436; 138/42, 43, 45; 16/51, 52; 267/64.12, 124; 92/8–12, 169

[56] References Cited

U.S. PATENT DOCUMENTS

| | | | |
|---|---|---|---|
| 3,731,770 | 5/1973 | Bindon | 188/318 X |
| 4,057,129 | 11/1977 | Hennells | 188/287 X |
| 4,076,225 | 2/1978 | Houghton | 188/285 X |
| 4,476,967 | 10/1984 | Tetsus | 188/299 X |

Primary Examiner—Douglas C. Butler
Attorney, Agent, or Firm—Leydig, Voit & Mayer, Ltd.

[57] ABSTRACT

A pressure regulator mechanism for use in a hydraulic device having a cylinder and a piston slidably movable therein, includes a casing housing the cylinder therein, a first restriction on the cylinder for forming a portion of a passage of working oil between the cylinder and the casing, a valve member angularly movable around an axis of movement of the piston for closing the first restriction, and a second restriction on the valve member for forming a remaining portion of the passage when brought into confronting relation to the first restriction in response to angular movement of the valve member. One of the first and second restrictions has different cross-sectional areas selectable for communication therethrough between the first and second restrictions, so that the rate of flow of the working oil through the passage can be varied.

7 Claims, 7 Drawing Figures

PRESSURE REGULATOR MECHANISM FOR HYDRAULIC DEVICES

BACKGROUND OF THE INVENTION

The present invention relates to a pressure regulator mechanism for use in a hydraulic device having a cylinder and a piston, such as a hydraulic cylinder or a hydraulic absorber, for example.

SUMMARY OF THE INVENTION

It is an object of the present invention to provide a pressure regulator mechanism for use in hydraulic devices which is capable of regulating the pressure with ease and has a simple and compact construction.

According to the present invention there is provided a pressure regulator mechanism for use in a hydraulic device having a cylinder and a piston slidably movable therein, including a casing housing the cylinder therein, a first restriction means on the cylinder for forming a portion of a passage of working oil between the cylinder and the casing, a valve member angularly movable around an axis of movement of the piston for closing the first restriction means, and a second restriction means on the valve member for forming a remaining portion of the passage when brought into confronting relation to the first restriction means in response to angular movement of the valve member. One of the first and second restriction means has different cross-sectional areas selectable for communication therethrough between the first and second restriction means, so that the rate of flow of the working oil through the passage can be varied.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
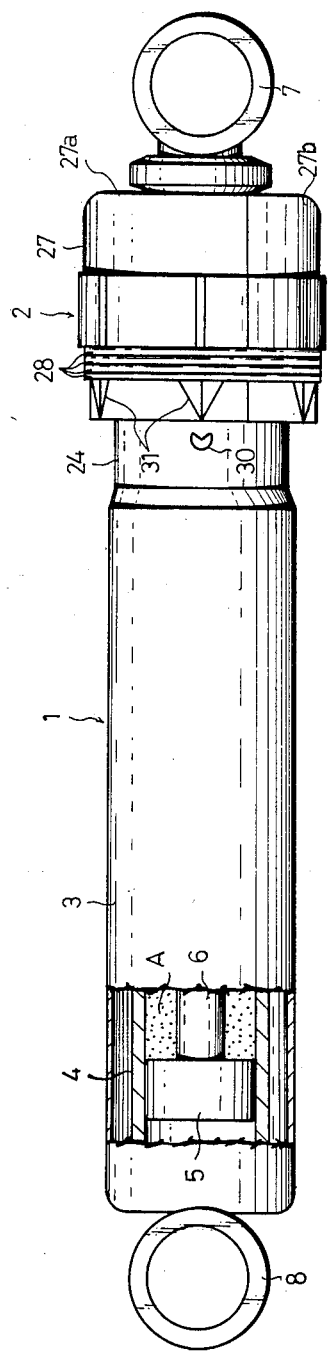
FIG. 1 is a front elevational view, partly broken away, of a hydraulic absorber incorporating a pressure regulator mechanism according to a first embodiment of the present invention.

1st Embodiment:

A pressure regulator mechanism according to a first embodiment of the invention, which is incorporated in a hydraulic absorber, will be described with reference to FIGS. 1 and 2.

The hydraulic absorber is generally composed of an absorber assembly 1 and a pressure regulator mechanism 2. The absorber assembly 1 has a cylindrical casing 3 housing therein a hollow cylinder 4 having substantially the same length as that of the cylindrical casing 3, with a piston 5 being reciprocably disposed in the cylinder 4. A rod 6 is connected at an end to the piston 5 and has an opposite end extending through the pressure regulator mechanism 2 and having an exposed end to which an attachment 7 is attached on a movable side of the absorber. An attachment 8 is attached to an opposite end of the casing 3 on a fixed side of the absorber.

Figure 2:
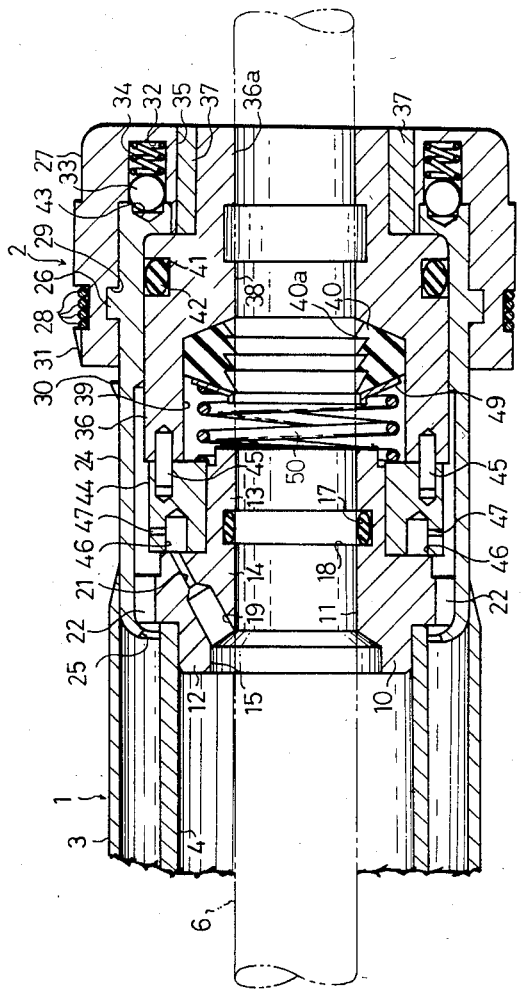
FIG. 2 is an enlarged cross-sectional view of the pressure regulator mechanism of the first embodiment.

As shown in FIG. 2, a cylinder cap 10 is fitted in the end of the cylinder 4 and has a central through hole 11 through which the rod 6 extends. The cylinder, cap 10 has an integral construction including a retained cylindrical portion 12 force-fitted in the end of the cylinder 4, a larger-diameter cylindrical portion 14 larger in diameter than the retained portion 12 and extending radially outwardly past the end of the cylinder 4, and a smaller-diameter cylindrical portion 13 smaller in diameter than the larger-diameter portion 14 and extending axially away from the cylinder 4. The retained portion 12 has a recess 15 defined therein and having a diameter greater than that of the through hole 11. The smaller-diameter cylindrical portion 13 has a circumferential slot 18 formed in its inner surface and receiving an annular rubber seal 17 fitted therein. The larger-diameter portion 14 of the cylinder cap 10 has therein a guide hole 19 and a first restriction hole 21 extending obliquely in coaxial relation. The guide hole 19 has an inner end opening into the recess 15 and the first restriction hole 21 has an outer end opening at a step between the larger-diameter portion 14 and the smaller-diameter cylindrical portion 13. The larger-diameter portion 14 has a plurality of slits 22 defined in an outer peripheral surface thereof at angularly spaced positions one of which corresponds to the first restriction hole 21.

The pressure regulator mechanism 2 has an attachment cylinder 24 fitted in the end of the casing 3 of the absorber assembly 1. The attachment cylinder 24 has an opening 25 defined in an end thereof and providing an annular clearance between the peripheral edge of the opening 25 and the outer peripheral surface of the cylinder 4. The attachment cylinder 24 also has an annular ridge 26 on an outer peripheral surface thereof at the end remote from the opening 25. A cup-shaped grip 27 is rotatably fitted over the the end of the attachment cylinder 24 remote from the casing 3, the cup-shaped grip 27 comprising a pair of half grips 27a, 27b (FIG. 1) coupled together by a plurality of coupling rings 28. The grip 27 is prevented from being removed from the attachment cylinder 24 by the annular ridge 26 on the attachment cylinder 24 fitted in an annular groove 29 defined in an inner peripheral surface of the grip 27.

The grip 27 has on an outer peripheral surface and at an end thereof a plurality of (six in the illustrated embodiment) positioning teeth 31 pointed to an indicia 30 on the attachment cylinder 24. The grip 27 also has a plurality of housing cavities 32 defined in an inner wall surface of the grip 27 in axial alignment with the positioning teeth 31. The housing cavities 32 accommodate balls 33 partly fitted in retaining recesses 43 in the attachment cylinder 24 and springs 34 for urging the balls 33 toward the retaining recesses 43. The balls 33, the springs 34, and the retaining recesses 43 jointly constitute a retaining means for retaining the grip 27 in an angular position with respect to the attachment cylinder 24 through the fitting engagement of the balls 33 in the retaining recesses 43 when one of the positioning teeth 31 is aligned with the indicia 30.

An angularly movable sleeve 36 is angularly movably housed in the attachment cylinder 24 and has an outside diameter which is substantially the same as the inside diameter of the attachment cylinder 24. The sleeve 36 has a smaller-diameter portion 36a fitted in an opening 35 in the grip 27 and held in engagement for corotation with the grip 27 through a plurality of keys 37. The sleeve 36 has a central through hole 38 through which the rod 6 extends, and a larger-diameter recess 39 defined at an end of the through hole 38. A thick annular rubber packing 40 is force-fitted in the larger-diameter recess 39 and has on its inner peripheral surface a serrated oil thrower 40a for preventing leakage of working oil A toward the outer end of the sleeve 36. A seal ring 42 is fitted in an annular groove 41 defined in an outer peripheral surface of the sleeve 36 for preventing working oil A entered between the attachment cylinder 24 and the sleeve 36 from leaking outwardly.

An annular valve member 44 is angularly movably fitted over the smaller-diameter cylindrical portion 13 of the cylinder cap 10 and is held in corotating relation to the sleeve 36 by a plurality of connecting pins 45. The valve member 44 has a plurality of (six in the illustrated embodiment) holes 46 defined in an end surface thereof and angularly equally spaced, the holes 46 opening at a peripheral surface where the first restriction hole 21 opens and extending axially of the rod 6. The valve member 44 also has second restriction holes 47 of different cross-sectional areas defined in inner peripheral surfaces of the holes 46 and extending in directions normal to the axis of the rod 6. When one of positioning teeth 31 is aligned with the indicia 30, a passage of the working oil A is formed through the guide hole 19, the first restriction hole 21, one of the holes 46, and one of the second restriction holes 47 between the casing 3 and the cylinder 4. Each of the second restriction holes 47 has a cross-sectional area smaller than the cross-sectional area of the guide hole 91.

A compression spring 50 is interposed between the valve member 44 and a washer 49 covering the rubber packing 40 within the larger-diameter recess 39 in the sleeve 36 for normally urging the valve member 44 to be pressed against the cylinder cap 10.

Operation of the pressure regulator mechanism 2 in the hydraulic absorber thus constructed is as follows:

When the grip 27 is turned to bring one of the positioning teeth 31 into alignment with the indicia 30 on the attachment cylinder 24 as shown in FIG. 1, the balls 33 are fitted respectively in the retaining recesses 43 to hold the grip 27 in an angular position. As the grip 27 is thus turned, the sleeve 36 is turned therewith through a certain angle by the keys 37, and the valve member 44 is turned therewith by the connecting pins 45 so that one of the holes 36 is held in register with the first restriction hole 21. When the piston 5 in the absorber assembly 1 is moved to the right as shown under this condition, working oil A in the cylinder 4 is caused to flow through the guide hole 19, the first restriction hole 21, the hole 46 in the valve member 44, and the second restriction hole 47 thereof into the attachment cylinder 24. Thereafter, the working oil A flows through the slits 22 in the cylinder cap 10 and the opening 25 in the attachment cylinder 24 into the casing 3. Therefore, the pressure of the working oil A dependent on the cross-sectional area of the second restriction hole 47 of the smallest diameter acts on the piston 5 in the absorber. When the piston 5 is moved to the left, the working oil A flows from the casing 3 into the cylinder 4 in a direction opposite to the direction as described above.

When the grip 27 is turned to a position in which the positioning tooth 31 is out of alignment with the indicia 30, the hole 46 in the valve 44 does not confront the first restriction hole 21 in the cylinder cap 10, and the first restriction hole 21 is closed by the end surface of the valve member 44, thus closing the passage for the working oil A between the casing 3 and the cylinder 4. Therefore, the piston 5 is rendered immovable and the attachment 7 on the movable side is locked.

When the grip 27 is further turned to bring a next positioning tooth 31 into alignment with the indicia 30, a next hole 46 confronts the first restriction hole 21. Since a second restriction hole 47 of a different diameter is now connected to the first restriotion hole 21, the rate of flow of the working oil A is controlled dependent on the cross-sectional area of the second restriction hole 47, thereby adjusting the hydraulic force acting on the piston 5.

By changing the second restriction hole 47 to be connected to the first restriction hole 21 in response to angular movement of the grip 27, the force for operating the piston 5 in the hydraulic absorber can easily be adjusted. With the foregoing construction, the valve member 44 and the grip 27 are turned around the axis along which the piston 5 is movable, so that the absorber assembly 1 and the pressure regulator mechanism 2 can be arranged in coaxial relationship, and the overall construction can be compact. The hydraulic absorber therefore takes up a small space when it is installed in various apparatus.

Figure 3:
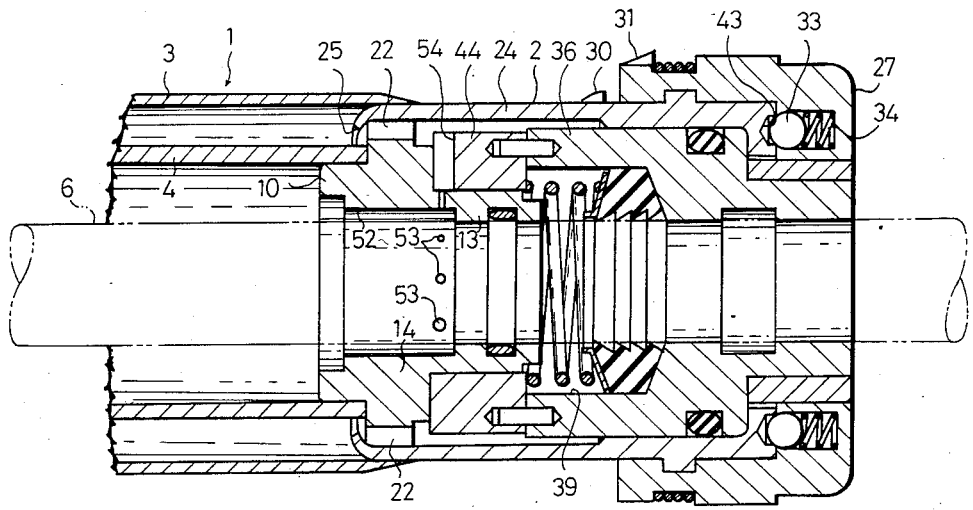
FIG. 3 is a cross-sectional view of a pressure regulator mechanism according to a second embodiment of the present invention.
Figure 4:
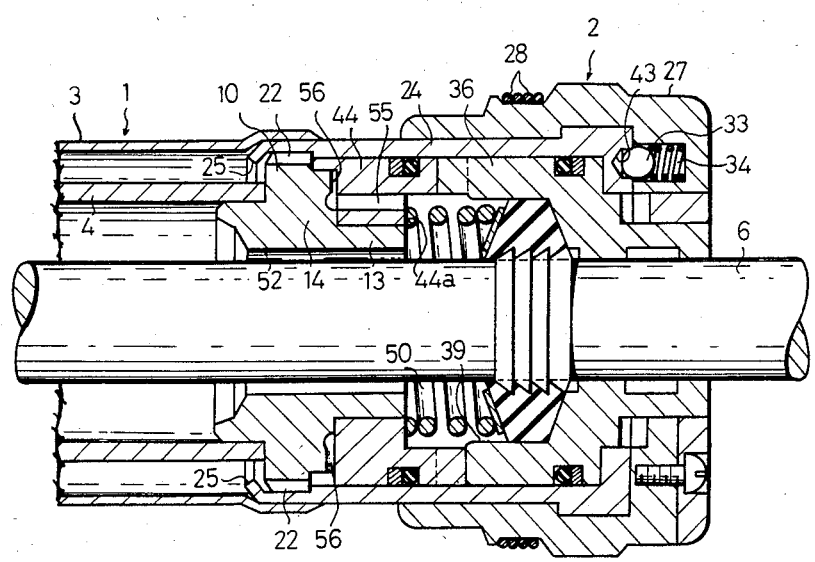
FIG. 4 is a cross-sectional view of a pressure regulator mechanism according to a third embodiment of the present invention.

2nd Embodiment:

A pressure regulator mechanism according to a second embodiment as incorporated in a hydraulic absorber will be described with reference to FIG. 3. The pressure regulator mechanism of the second embodiment differs from the pressure regulator mechanism of the first embodiment as to the construction of the first and second restriction holes. More specifically, a cylinder cap 10 has a oil flow recess 52 extending from an end thereof toward a junction between a larger-diameter portion 14 and a smaller-diameter cylindrical portion 13 and having an inside diameter greater than the diameter of a rod 6. The cylinder cap 10 also has a plurality of first restriction holes 53 of different cross-sectional areas opening at an inner peripheral surface of the recess 52 closely to an inner end thereof, the first restriction holes 53 also opening at an outer peripheral surface at the base of the smaller-diameter cylindrical portion 13. A valve member 44 has a second restriction hole 54 defined at an axial end thereof and extendially radially in a direction normal to the axis of the rod 6. As a grip 27 is turned, the second restriction hole 54 is registered with one of the first restriction holes 53 in positions in which balls 33 engage in retaining recesses 54, respectively. The other components are the same as those of the first embodiment, and denoted by the same reference numerals, and will not be described.

With the second embodiment, therefore, the rate of flow of the working oil A flowing between a casing 3 and a cylinder 4 can be adjusted by selectively bringing the second restriction hole 54 into confronting relation to one of the first restriction holes 53 through rotation of the grip 27, since the first restriction holes 53 have different cross sectional areas. Accordingly, the hydraulic force acting on the piston 5 can be adjusted as desired. The second embodiment is more advantageous in that the first and second restriction holes 53, 54 are simpler in shape and can be formed more easily.

3rd Embodiment:

A pressure regulator mechanism according to a third embodiment, as incorporated in a hydraulic absorber, different from the pressure regulator mechanism of the second embodiment as follows: An oil flow recess 52 defined in a cylinder cap 10 opens into a larger-diameter recess 39 defined in an angularly movable sleeve 36. A valve member 44 has a second restriction hole 55 defined therein and extending axially of the rod 6, the second restriction hole 55 having one end opening into the larger-diameter recess 39. The cylinder cap 10 includes a larger-diameter portion 14 having a plurality of first restriction holes 56 of different cross-sectional areas opening toward a surface of the valve member 44 against which the larger-diameter portion 14 is held. As a grip 27 is turned, one of the first restriction holes 56 confronts the second restriction hole 55 in positions in which balls 33 engage in retaining recesses 43. In the third embodiment, there is no clearance between an attachment cylinder 24 and the valve member 44 disposed therein of the pressure regulator mechanism 2.

Operation of the pressure regulator mechanism 2 is as follows: When a piston 5 is moved to the right, the working oil A flows from the oil flow recess 52 into the larger-diameter recess 39, from which the working oil flows through the second restriction hole 55, one of the first restriction holes 56, one of the slits 22 communicating therewith, and an opening 25 into a casing 3. As with the previous embodiments, the rate of flow of the working oil A flowing between the casing 3 and a cylinder 4 can be adjusted by selectively bringing the second restriction hole 55 into confronting relation to one of the first restriction holes 56 through rotation of the grip 27, since the first restriction holes 56 have different cross sectional areas.

Upon the working oil a flowing into the larger-diameter recess 39, the hydraulic force acts on a surface 44a of the valve member 44 against which a compression spring 50 is held. The hydraulic force therefore assists the compression spring 50 in pressing the valve member 44 against the cylinder cap 10. The spring force of the compression spring 50 may thus be weaker than those of the compression springs in the foregoing embodiments.

Figure 5:
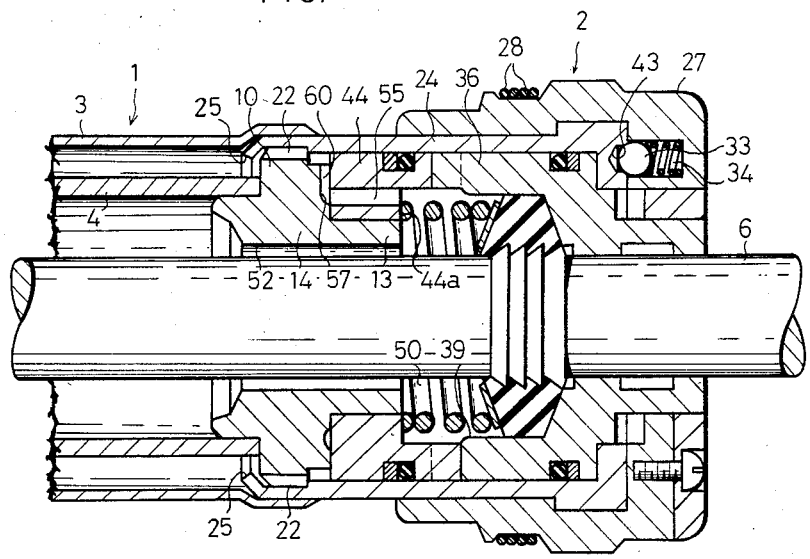
FIG. 5 is a cross-sectional view of a pressure regulator mechanism according to a fourth embodiment of the present invention.
Figure 6:
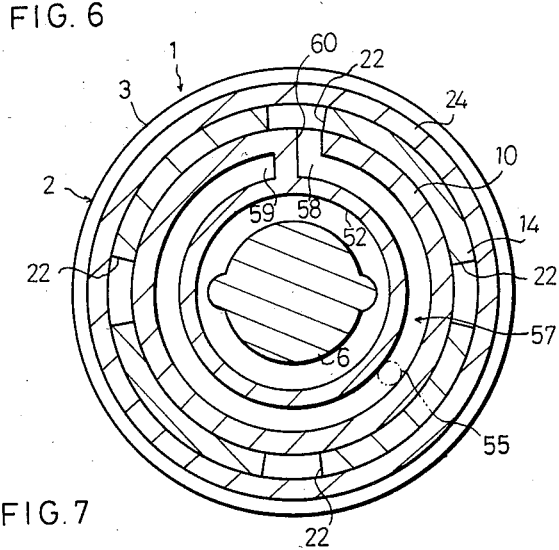
FIG. 6 is a cross-sectional view showing the configuration of a restriction groove in the pressure regulator mechanism of FIG. 5.
Figure 7:
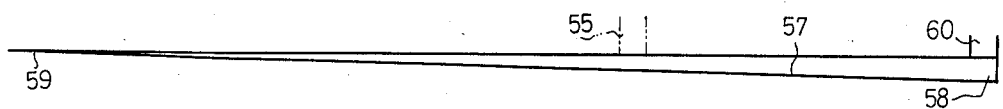
FIG. 7 is a developed diagram illustrative of the manner in which the depth of the restriction groove of FIG. 6 varies.

4th Embodiment:

A pressure regulator mechanism according to a fourth embodiment will be described with reference to FIGS. 5 through 7 as to its differences with the third embodiment. As shown in FIG. 6, a cylinder cap 10 has a substantially annular restriction groove 57 defined in an end surface thereof and having closed ends. As illustrated in FIG. 7, the annular restriction groove 57 has a depth greatest at a starting end 58 and progressively smaller toward an opposite terminal end 59. The restriction groove 57 is held in communication with one of the slits 22 through a communication hole 60 connected to the slit 22 and the starting end 58 radially outwardly thereof.

When a second restriction hole 55 in a valve member 44 is held in confronting relation to the restriction groove 57 at any position thereon as indicated by the two-dot-and-dash lines in FIGS. 6 and 7, the restriction groove 57 and the second restriction hole 55 are brought into communication with each other at the confronting position. Therefore, the rate of flow of the working oil A is determined by the depth or cross-sectional area of the restriction groove 57 at the communicating position. With the restriction groove 57 and the second restriction hole 55 thus communicating with each other, the working oil A flows through the restriction groove 57 between the communication hole 60 and the second restriction hole 55.

The rate of flow of the working oil A can continuously be adjusted over the entire length of the restriction groove 57. With the fourth embodiment, however, there are a plurality of retaining recesses 43 for angularly positioning a valve member 44 so that a grip 27 is angularly lockable in angularly spaced positions in a steplike manner. The rate of flow of the working oil A can easily be confirmed from the exterior by an indicia and a number of positioning teeth axially aligned with the retaining recesses 43, as with the first and second embodiments.

When the second restriction hole 55 in the valve member 44 is positioned out of axial alignment with the restriction groove 57, but somewhere between the ends 58, 59 away from the restriction groove 57, the second restriction hole 55 is closed off, and a piston is rendered immovable.

The present invention is not limited to hydraulic absorbers illustrated in the above embodiments, but is applicable to various drive units utilizing hydraulic cylinders and hydraulic pressure.

With the arrangement of the invention, the hydraulic pressure can easily be adjusted through a simple operation by a mechanism which is simple and compact in construction.

Although certain preferred embodiments have been shown and described, it should be understood that many changes and modifications may be made therein without departing from the scope of the appended claims.

What is claimed is:

1. A pressure regulator mechanism for use in a hydraulic device having a cylinder and a piston slidably movable therein, comprising:
   (a) a casing housing said cylinder therein;
   (b) first restriction means on said cylinder for forming a portion of a passage of working oil between said cylinder and said casing, said first restriction means comprising a single annular restriction groove defined in a cylinder cap on the end of said cylinder; said annular restriction groove having closed ends and a continuously varying cross-sectional area;
   (c) a valve member angularly movable around an axis of movement of said piston for closing said first restriction means; and
   (d) second restriction means on said valve member for forming a remaining portion of said passage when brought into confronting relation to said first restriction means in response to angular movement of said valve member, said second restriction means comprising a single restriction hole defined in said valve member.

2. A pressure regulator mechanism according to claim 1, wherein said first and second restriction means are first and second restriction concavities defined respectively in a cylinder cap mounted on an end of said cylinder and said valve member.

3. A pressure regulator mechanism according to claim 2, wherein said first restriction concavity comprises an annular restriction groove having closed ends and a continuously varying cross-sectional area, said cylinder can having a communication hole defined at one of said ends radially outwardly thereof and a slit communicating with said communication hole.

4. A pressure regulator mechanism according to claim 1, wherein said first restriction means is defined in a cylinder cap mounted on an end of said cylinder, said valve member being pressed against said cylinder cap by a compression spring. .

5. A pressure regulator mechanism according to claim 4, including an angularly movable sleeve disposed coaxially with said cylinder and having a larger-diameter recess, said cylinder cap having a central oil flow passage communicating said larger-diameter recess with said cylinder, said valve member being pressed against said cylinder cap under the hydraulic force of working oil entering said larger-diameter recess.

6. A pressure regulator mechanism according to claim 1, including a grip connected coaxially to said valve member.

7. A pressure regulator mechanism according to claim 6, including retaining means between said grip and said valve member for positioning said valve member in a position in which said first and second restriction means are held in confronting relation to each other.

* * * * *